United States Patent [19]

McGinniss

[11] 4,039,414
[45] Aug. 2, 1977

[54] ULTRAVIOLET CURING OF ELECTROCOATING COMPOSITIONS

[75] Inventor: Vincent D. McGinniss, Valley City, Ohio

[73] Assignee: SCM Corporation, New York, N.Y.

[21] Appl. No.: 480,738

[22] Filed: June 19, 1974

[51] Int. Cl.$^2$ .................................. C25D 13/06
[52] U.S. Cl. ........................................ 204/181
[58] Field of Search .................... 204/181; 427/54

[56] References Cited

U.S. PATENT DOCUMENTS

| 3,455,806 | 7/1969 | Spoor et al. | 204/181 |
| 3,492,213 | 1/1970 | Johnson | 204/181 |
| 3,511,687 | 5/1970 | Keyl et al. | 204/159.19 |
| 3,554,886 | 1/1971 | Colomb et al. | 204/159.12 |
| 3,565,779 | 2/1971 | Luders et al. | 204/159.14 |
| 3,761,371 | 9/1973 | Dickie et al. | 204/181 |
| 3,926,639 | 12/1975 | Rosen et al. | 427/43 |
| 3,939,051 | 2/1976 | Anderson et al. | 204/181 |

*Primary Examiner*—Howard S. Williams
*Attorney, Agent, or Firm*—Thomas M. Schmitz

[57] ABSTRACT

An electrocoating composition useful for electrocoating a paint from an aqueous solution onto a cathode conductive substrate can be cured with ultraviolet energy. The electrocoating composition containing an ultraviolet sensitizer uniformly electrodeposits on the cathode substrate to provide a paint film thereon containing a constant level of ultraviolet sensitizer relative to a reactive ethylenically unsaturated polymer.

5 Claims, No Drawings

ULTRAVIOLET CURING OF ELECTROCOATING COMPOSITIONS

BACKGROUND OF THE INVENTION

Electrocoating compositions are well known and are disclosed in Gilchrist patents, such as U.S. Pat. Nos. 3,351,675, 3,362,899, 3,575,909, and 3,351,575, and the same are incorporated herein by reference. Prior art electrocoating compositions are often cured by the inclusion of catalysts which cure the electrocoated composition by application of heat. Electrodeposition of conventionally heat-curable electrocoating polymers onto cathode substrates are disclosed in U.S. Pat. Nos. 3,617,458 and 3,679,564, and said patents are incorporated herein by reference. More recently, electron beam polymerization of electrocoating compositions has been suggested in U.S. Pat. No. 3,501,390 and U.S. Pat. No. 3,501,391, and the same are incorporated herein by reference.

It now has been found that a water-dispersible ethylenically unsaturated polymer containing ultraviolet sensitizer can be solubilized in aqueous solutions for use in electrocoating baths. The polymer can be uniformly electrocoated onto a cathode substrate while maintaining a critical ratio of ultraviolet sensitizer to polymer whereby consistent and uniformly cured paint films can be achieved upon exposure to ultraviolet (UV) energy. This invention provides an expedient and efficient solution to inherent problems in electrocoating a polymer onto a cathode substrate wherein the polymer tends to electrocoat at a different rate than the sensitizer. In this regard, electrocoating polymers must be rendered water soluble as well as curable by ultraviolet energy. Electrocoating compositions of this invention contain the ultraviolet sensitizers wherein the polymer and sensitizer are stabilized in the electrocoating bath to properly maintain a constant ratio of sensitizer to polymer when the polymer is electrocoated onto the cathode substrate. Up to about 5% photosensitizer is required to activate the polymer with actinic radiation and the ratio of polymer relative to a low percentage of ultraviolet sensitizer must be maintained upon electrocoating the polymer onto the cathode substrate so that a complete cure is achieved upon exposure to ultraviolet light.

Accordingly, a primary object of this invention is to provide an electrodepositable composition containing a stabilized ratio of ultraviolet sensitizer dispersed in an ethylenically unsaturated polymer solubilized in aqueous solution that can be efficiently and uniformly electrocoated onto a cathode substrate and subsequently cured with ultraviolet energy.

A further object is to provide a water dispersed polymer containing ultraviolet sensitizer connected to the polymer backbone and suitable for electrocoating on a cathode substrate and curable by ultraviolet sensitizer.

A further object is to provide a process for solubilizing an ethylenically unsaturated polymer containing an ultraviolet sensitizer within a aqueous solution, electrocoating a constant ratio of ultraviolet sensitizer and polymer onto a cathode conductive substrate to provide a paint film, and irradiating the coating with ultraviolet energy until the paint film becomes fully cured.

These and other advantages of the invention will become more apparent by referring to the Detailed Description of the Invention.

SUMMARY OF THE INVENTION

A water-dispersed composition for electrodepositing a paint film onto a cathode conductive substrate wherein the electrocoating composition comprises an ethylenically unsaturated polymer containing ultraviolet sensitizer and dispersed in an aqueous solution. The composition can be uniformly electrocoated onto a cathode substrate to form a paint film containing a constant ratio of minor amounts of ultraviolet sensitizer to polymer, and can be efficiently cured by exposing the paint film to ultraviolet energy.

DETAILED DESCRIPTION OF THE INVENTION

The electrocoating composition of this invention comprises a water-dispersible ethylenically unsaturated polymer containing ultraviolet sensitizer. Referring first to the polymer, the ethylenically unsaturated polymers comprise vinyl polymers having pendent unsaturated vinyl groups selected from acrylyl, acrylamide, and allyl unsaturation and further include reactive ethylenic unsaturation in the polymer backbone. The reactive ethylenic unsaturation can be effectively cured by ultraviolet light energy through a free radical polymerization process wherein a free radical is induced by the UV sensitizer upon exposure to ultraviolet energy irradiation thereby causing polymerization of pendent vinyl unsaturation and/or ethylenic unsaturation contained in the polymer backbone. The reactive ethylenically unsaturated polymers further contain pendent amine groups or amine groups attached to the polymer backbone which can be neutralized with water solubilizing acid derivative to disperse the polymer in water and render the polymer positively charged whereby the polymer can be electrocoated onto a cathode substrate. Hence, the polymer contains ethylenic unsaturation in the polymer backbone, pendent vinyl groups, and amine groups.

The preferred ethylenically unsaturated polymers are acrylyl unsaturated polymers containing acrylic acid, methacrylic acid, or sorbic acid copolymerized with other reactive polymeric groups, such as by esterification or etherification, to form an acrylic unsaturated polymer having pendent or terminal acrylic unsaturation. The acrylyl unsaturated polymers are linear or branch acrylyl polymers having a molecular weight in the range of 170 to 100,000 and even higher in acrylic emulsion polymers. The unsaturated acrylyl groups cross-link into a three-dimensional insoluble, infusible polymer upon being irradiated with ultraviolet actinic light. The acrylyl groups can be pendent as in a branch portion of acrylic polymers wherein acrylic acid is reacted with glycidyl acrylate or an epoxy novolac resin or esterified onto a hydroxyl containing polymer backbone. Acrylyl terminated polymers can be ethylenically unsaturated diacrylyl terminated polymers such as disclosed in U.S. Pat. No. 3,759,808. Acrylyl polymers can be prepared from polyfunctional organic acids, polyfunctional epoxides, polyfunctional isocyanates, or dicarboxylic acid esters of polyepoxides, polyamines, polyisocyanates with 2-hydroxyalkyl acrylates or methacrylates. Representative classes of acrylyl terminated polymers include, for example, acrylyl terminated polyesters, urea acrylates, melamine acrylates urethanes, acrylyl oils, acrylyl hydrocarbon resins, epoxies, and epoxy-esters, amideester acrylyl terminated polymers, polymether acrylyl terminated polymers, hydrocarbon acrylyl terminated prepolymers, and generally polymers having two or more pendent or terminal acrylyl groups. Specific acrylic polymers can include, for example, trimethylolpropane triacylate, pentaerythritol triacrylate, ethyleneglycol diacrylate, diacrylic acid adduct of th diglycidyl ether of bisphenol (DER 332 diacrylate), a di-or tri-isocyanate reacted with a hydroxy containing acrylate such as hydroxyethyl or hydroxypropyl acrylate.

Other useful polymers include acrylamide and allyl unsaturation incorporated into the polymers to provide reactive pendent or terminal vinyl unsaturation in the polymer that can be activated by ultraviolet energy to cross-link into hard, infusible polymer. Allyl unsaturation can be achieved by reacting allyl alcohol with epichlorhydrin and thereafter reacted with a polyol or reactive hydroxyl containing prepolymer or reactive acid containing prepolymers to produce, for example, allyl glycidyl ethers or esters such as allyl glycidyl acrylate, allyl glycidyl methacrylate, and allyl glycidyl ether. Acrylamides can be produced, for example, by a trans-etherification reaction of a butyl or methyl ether of methylacrylamide to produce a polymer having acrylamide vinyl unsaturation that reacts upon exposure to ultraviolet irradiation to produce an infusible polymer.

Ethylenically unsaturated alkyds and polyester are useful resins containing reactive ethylenic unsaturation in the polymer backbone. Both unsaturated alkyds and unsaturated polyesters are produced by esterifying polyols with dibasic acids wherein at least about 20% of the dibasic acids are reactive unsaturated dibasic acids such as maleic, fumaric, and itaconic acids or anhydrides. Unsaturated alkyd resins differ in that glycerol and pentaerythitol are ordinarily utilized instead of a glycol and such polyols are partially reacted with fatty acids.

The ethylenically unsaturated polymers useful in this invention further contain pendent amine groups or amine groups attached to the polymer backbone to render the polymer water dispersible and provide an aqueous electrocoating solution. Amine groups can be attached to the polymer by reacting free carboxyl groups on a polymer (polyester, acrylic, urethane, etc.) containing available carboxylic groups which can be reacted with alkyleneimine or substituted alkyleneimine, as proposed in U.S. Pat. Nos. 3,679,564 and 3,617,458, and incorporated herein by reference. Similarly, amine groups can be introduced into the polymer by reacting pendent carboxylic acid groups on a polymer with ethylene imine or derivatives of ethylene imine. Difunctional amides also can be reacted with reactive pendent carboxyl groups on the polymer. Typical acrylyl, allyl, acrylamide, and other ethylenically unsaturated polymers reacted with an amine to provide amine functionally useful in this invention are further disclosed in the examples.

Particularly preferred amine modified ethylenically unsaturated polymers are acrylic polymers having a portion of the acrylic unsaturation reacted with secondary amines selected frcm morpholine, diethanolamine, methylethanol amine, and diallylamine to produce an amine polymer containing amine groups suitable for reacting with an acid and rendering the polymer water dispersible. The particularly preferred amine modified unsaturated polymers are produced by the addition reaction of the secondary amine across the acrylic double bond or alpha, beta unsaturated carbonyl group in the polymer backbone and is known as the Michael-type addition reaction as more particularly described in "Organic Reactions," Vol. 10 (pages 179–555), John Wiley & Sons (1959), and incorporated herein by reference. Acrylyl terminated polymers useful for modifying with a secondary amine include, for example, acryl terminated polyesters, urea acrylates, urethanes, acrylyl oils, acrylyl hydrocarbon resins, epoxies, epoxyesters, and like polymers having at least two and preferably at least three pendent or terminal acrylyl groups per oligomer or polymer molecule. At least about 10 mole percent of the acylyl groups are reacted with a secondary amine and at least about 10 mole percent of the acrylyl groups remain as unreacted double bonds in producing the amine modified acrylyl unsaturated polymer. The secondary amine can be readily added to a polar carbon-carbon double bond of an ethylenically unsaturated polymer in the general reaction scheme as follows:

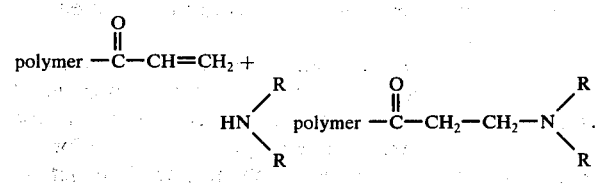

The polar alpha, beta unsaturated carbonyl group in the ethylenically unsaturated polymer can be, for example, pendent or terminal acrylic unsaturation. The polymer can be dissolved in a solvent such as acetone, dimethylfluoride (DMF), tetrahydrofluoride (THF), cellosolve solvents, and aromatic solvents. Thereafter the secondary amine is added to the solution of polymer and solvent at a rate such as to avoid an uncontrollable exotherm and at a solution reaction temperature of between about 20° C to 70° C. Typical examples of amine modified ethylenically unsaturated polymers having a pendent or terminal secondary amine added thereto include, for example, trimethylolpropanetriacrylate morpholine, pentaerythitol-triacrylate morpholine, and epoxidized soybean oil acrylate morpholine.

The UV sensitizers or photosensitizers are combined with the reactive ethylenic unsaturated polymers, and are adapted to be simultaneously co-deposited with the polymer onto the substrate during the electrocoating process. The UV sensitizers are added to the polymers in amounts of at least 0.5% and preferably between about 1% to 5% by weight based on the polymer. The level of the UV sensitizer remains substantially constant both in the electrocoating bath solution and during the electrocoating process to provide a paint film on the substrate containing UV sensitizer in the proper proportions to the polymer. Ultraviolet irradiation causes the sensitizer to break up into free radicals which activate the reactive double bond unsaturation of the pendent vinyl group of ethylenic unsaturation in the polymer backbone to effect cross-linking thereof until the irradiated paint film is fully cured. Useful ultraviolet photosensitizers include halogenated polynuclear ketones generally represented by the formula

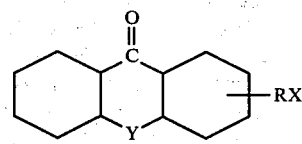

wherein Y is a carbon, a carbonyl

sulfur, oxygen, a halosubstituted carbon; RX is a halogen-containing radical selected from halosulfonyl, alpha-haloalkyl, and alpha-haloalkylated aryls. The halogenated polynuclear ketones can be selected from chlorosulfonated benzanthones, chlorosulfonated fluorenone, alphahaloalkylated benzanthrones, and alphahaloalkylated fluorenone, as disclosed in copending Serial No. 323,031 filed January 12, 1973, and incorporated herein by reference. The benzanthrones can be selected from chloromethyl benzanthrone; sulfonyl chloride benzanthrone; 1,6dichlorosulfonyl benzanthrone; isodibenzanthrone sulfonyl chloride; and dichlorosulfonyl-16,17-dibenzanthrone. The fluorenones can be selected from 2-bromomethyl-9-fluorenone sulfonyl chloride; chloromethyl-9-fluorenone-6,7-dichloro-alpha-bromofluorenone sulfonyl chloride; and 1-chloro-2-ethyl-9-fluorenone sulfonyl chloride.

Other suitable ultraviolet sensitizers include organic carbonyl compounds selected from alkylphenones, benzophenones, and tricylic fused ring compounds, as disclosed as disclosed in U.S. Pat. No. 3,759,807 and incorporated herein by reference. Particularly desirable organic carbonyl photosensitizers can be selected from diethoxyacetophenone, xanthone, thio-xanthone, anthraquinone, and acetonaphthone. Other suitable ultraviolet sensitizers include carbonylated phenyl nuclear sulfonyl chlorides such as meta-benzophenone monosulfonyl chloride, meta-acetophenone monosulfonyl chloride, and meta-benzaldehyde monosulfonyl chloride are particularly suitable for pigmented coatings as more particularly set forth in copending Ser. No. 323,032 filed Jan. 12, 1973, and incorporated herein by reference. Other suitable photosensitizer combinations particularly suitable for pigmented coatings are a combination of sensitizers comprising aromatic carbonyl compounds, aromatic aldehydes or aromatic ketones, and a synergistic sensitizer of about 0.05% to 3% of 2,2'-dithiobis-(benzothiazole) as more particularly set forth in copending Ser. No. 346,351, filed Mar. 30, 1973, and incorporated herein by reference.

At least about 0.5% by weight ultraviolet sensitizer and preferably 1% to 5% sensitizer is added to the polymer phase and thoroughly mixed or otherwise dispersed in the polymer phase prior to solubilizing the polymer in an aqueous solution.

A particularly preferred aspect of this invention is that the ultrviolet sensitizer can be further incorporated into the acrylic polymer backbone or otherwise tied into the polymer structure (polymer chain) of the ultraviolet curable electrocoating resin system. The photosensitizer is contained or tied into the polymer backbone by including at least about 2% by weight, and preferably between about 3% to 20% by weight photosensitizer incorporated into the polymer backbone. The photosensitizer can by synthesized into the polymer, for example, by reacting the photosensitizer with the polymer prior to solubilizing the polymer in water. Photosensitizers found useful in this invention are carboxylated phenyl nuclear ketones generally represented by the formula of

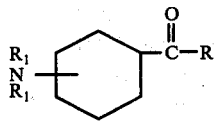

wherein R is an alkyl radical having 1 to 6 carbon atoms; and $R_1$ is selected from H and alkyl radicals having 1 to 6 carbon atoms. Carboxylated phenyl nuclear ketones can be selected from benzaldehyde derivatives, acetophenone derivatives, and benzophenone derivatives. Said ketones include benzaldehyde derivatives such as

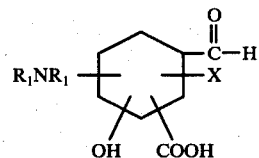

acetophenone derivatives such as

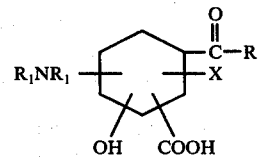

benzophenone derivatives such as

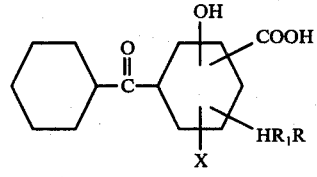

or

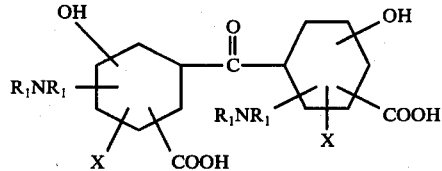

wherein X can be selected from chlorine, bromine, $NO_2$, N<, and OR. Particularly useful carboxylated phenyl nuclear ketone sensitizers include, for example, ortho-, meta-, and para-hydroxyacetophenone; 3-hydroxy-para-aminobenzaldehyde; 2-hydroxy-5-methoxybenzoaldehyde; 2-(para-hydroxybenzoyl)-benzoic acid; ortho- and para-hydroxy-benzophenone; 2-hydroxy-4-methoxybenzophenone; and 3,3',4,4'-benzophenone tetracarboxylicdianhydride. Other suitable photosensitizers include: 2-benzoylbenzoic acid; 4'-methylbenzophenone 2-carboxylic acid; 4-ethylbenzophenone 2-carboxylic acid; 4'-chlorobenzophenone 2-carboxylic acid; 3'-chloro-4'-methylbenzophenone-2-carboxylic acid; 3'-nitro-4'-chloro-benzophenone-2-carboxylic acid; 2, 3, and 4 hydroxy acetophenone; 5-chloro-2-hydroxy benzophenone; 2-(4-hydroxy-benzoyl)-benzoic acid; 2 and 4-hydroxy-benzophenone; 2-hydroxy-4-methoxybenzophenone; 3-hydroxy-para-anisaldehyde; 2-hydroxy-5-methoxybenzaldehyde; 3- chloro-4-hydroxy 5 methoxybenzaldehyde; 4'-chloro-2-hydroxy-4-methoxybenzophenone; 5-chloro-2-hydroxy-4-methylbenzophenone; 2-N-methylaminobenzophenone; 4-N-methylaminobenzophenone; 2-N-methylaminoacetophenone; 3-N-methylaminoacetophenone; 4-N-methylaminoacetophenone; and 2-mercaptobenzophenone, and others as identified in Examples 17 to 25.

The ethylenically unsaturation polymer having amine functionality and containing a suitable photosensitizer is rendered water soluble by reacting the polymer with a solubilizing acid salt being a proton donor for rendering the water dispersed polymer ionic and positive for electrocoating onto a cathode substrate. At least about 1% solubilizing salt is co-reacted with the ethylenically unsaturated polymer for neutralizing the amine groups pendent and attached to the polymer backbone. Useful solubilizing acids can include, for example, proton donating acids such as phosphoric, sulfuric, hydrochloric, acetic, formic, lactic, and other proton donating organic and inorganic acids. The preferred solubilizing acids are acetic and lactic acids. Neutralization of the ethylenically unsaturated polymer is based on the amine content of the polymer. At least about one-half the amine groups should be neutralized and preferably between 0.5 to 1.0 equivalents of the amines are neutralized. Preferably just enough acid is added to form a water soluble salt of the polymer, and preferably between about 5% and 10% by weight acid is added based on the weight of the ethylenically unsaturated polymer.

The ethylenically unsaturated polymers of this invention containing ultraviolet sensitizer can be solubilized or dispersed in water by adding the required amount of solubilizing salt to the polymer, and then adding water to the salt of the polymer. The resulting mixture thereof can be agitated to form a stable water solution. A preferred method of solubilizing the polymers is to add slightly warmed polymer containing photosensitizer to a water acid solution followed by agitating and warming the solution, if necessary, until the polymer is dispersed in the water. The solids content of such aqeuous dispersion of solubilized polymer is generally about 5 to 25 weight percent, and preferably about 5 to 15 weight percent.

The water dispersion of ethylenically unsaturated polymer containing ultraviolet sensitizer is particularly suitable for electrocoating onto a conductive metal cathode which is to the object to the coated with a paint film. The cathode substrate is an electrically conductive metal such as iron, steel, aluminum, galvanized steel, zinc, and the like. The coating composition can be electrocoated onto the cathode workpiece by passing a direct electric current between the anode and the cathode of the electrocoating bath to deposit a coating composition on the cathode.

Electrocoating is carried out at a voltage above the threshold voltage of the electrocoating paint composition being electrocoated onto the cathode workpiece. The threshold voltage is the voltage at which deposition of the solubilized ehtylenically unsaturated binder composition containing ultraviolet photosensitizers is initiated upon the workpiece when a direct electric current passed through the electrocoating bath between the workpiece and a second electrode referred to as an anode. The cathode is electrically negative in relation to the workpiece and spaced therefrom wherein both the anode and the cathode electric workpiece is in electrical contact with the electrocoating bath. The maximum tolerable voltage is slightly below the rupture voltage of the paint coating being applied to the substrate. The rupture voltage is commonly understood to be that voltage at which a paint film already applied to the substrate ruptures upon continued application of such voltage across the terminals during the immersion of the workpiece within the electrocoating bath. The minimum desirable voltage should range between about 20 volts and about 500 volts, and preferably between about 50 volts and 300 volts. The temperature of the electrocoating bath normally is between about 15° C and about 50° C. Preferably the temperature for electrodeposition is between about 20° C and about 35° C and maintenance of the bath temperature between this temperature range is preferred. Electrocoating bath agitation is desirable to maintain uniformity of composition as well as uniform temperatures at the cathode surfaces.

The electrocoating bath can be replenished continuously or incrementally with a replenishing composition so as to maintain the electrocoating bath approximately at a predetermined composition wherein the total replenishment is substantially equal over a sustained operating period.

After electrocoating the ethylenically unsaturated polymer composition onto the cathode workpiece, the electrocoating composition can then be cured with ultraviolet irradiation to form a hard, fully cured paint film. Typical sources of ultraviolet energy ordinarily produce wavelengths in the ultraviolet spectrum that are transmitted through a quartz and such wavelengths are usually between about 1600 A and 4000 A. Suitable ultraviolet emittors include various electric arc lamps, plasma arc torch, such as described in U.S. Pat. No. 3,364,387, and lasers having a lasing output in the ultraviolet spectrum as disclosed in U.S. application Ser. No. 189,254, and the disclosures of said references are included herein by reference, Other suitable sources of actinic light include quartz mercury lamps, ultraviolet quartz lamps, and high flash lamps.

Another aspect of this invention is that the paint film electrocoated onto the cathode substrate can be subjected to heat from gas-fired ovens or infrared heat to promote flowout of the electrocoating composition onto the substrate. Infrared heat applied to the paint film on the substrate, however, does not cure the paint film and does not effect curing of the paint film by subsequent exposure to ultraviolet radiation. Subjecting the paint film to heat prior to ultraviolet curing provides flowout and levelling of the paint film and is desirable, although preheating is not critical in practicing this invention.

The electrocoating composition can contain opacifying pigments and inert extenders such as, for example, titanium dioxide, zinc oxide, leaded zinc oxide, white lead, titanium calcium, clays such as kaolinite clays, silica, talc, mica, wollastonite, calcium carbonate, barium sulfate, ferrite yellow oxide, ferric oxide, "brown" iron oxide, tan oxides of iron, ultramarine blue, raw sienna, burnt sienna, raw and burnt amber, chromium oxide green, graphite, carbon black, zinc chromate, lampblack, calcium phosphate, calcium lead chromate, calcium phytate, chrome orange, cadmium reds and yellows, alumina, and elemental metal powders such as zinc, alumina, magnesium, and copper. It is advantageous that water soluble salts in the pigments, such as sodium or potassium salts, are very low and preferably absent so that the electrical resistance of the bath and the film deposition is not subject to uncontrolled variation, and that the primary control of the electrical conductance is by means of the binder resin and amino compound dispersed in the bath. The component pigments can also be organic such as the green iron salt of nitroso beta naphthol, copper phthalonitrile blue, toluidine red, parachlor red, para toner (red), alkali resistant red, BON red and maroon, Wachtung red, madder lake red, Duratone red, carmine red, and Hansa yellows.

The invention is illustrated by the following examples but not intended to be limited thereby.

EXAMPLE 1

One mole of trimethylolpropane triacylate was reacted with one mole of diethanolamine at a temperature of 80° F. The foregoing amine adduct was sensitized with 4% isobutyl ether of benzoin by mixing the same into the polymer phase to provide a uniform mixture. The molar equivalent of amine was 100% neutralized with acetic acid and then dissolved in water to give a 15% aqueous electrocoating solution which was electrocoated onto a steel panel acting as a cathode in an electrocoating bath. A 0.2 mil film was deposited on the cathode steel panel during one second electrocoating at a voltage of 100 volts. The film was washed and then heated with infrared heat at a temperature of about 180° F for about 5 minutes to obtain desirable flowout and levelling of the film. The heat did not cure the film. The levelled film was then exposed for five minutes to ultraviolet radiation emitted from an 800 watt GE mercury, medium pressure lamp. The film was hard and fully cured and resistant to methyl ethyl ketone (MEK) solvent.

A second paint film was electrocoated onto a cathode test panel in the manner hereinbefore described and was exposed to an 8,000 watt Ashdee No. 2 mercury lamp (ultraviolet source). A hard, fully cured and MEK resistant film resulted.

EXAMPLE 2

An electrocoating resin was synthesized by reacting one mole of pentaerythitoltriacylate with one mole of morpholine at a temperature of 80° F until loss of the secondary amine hydrogen (as determined by IR) had occurred. The amine adduct was sensitized with 2% equal mixture of Michler's Ketone and benzophenone by mixing the sensitizer into the polymer phase. The amine on the polymer was 60% neutralized with 10% weight formic acid and thereafter the polymer was dissolved in water to provide a 10% aqueous solution of electrocoating resin. The dispersed resin was electrocoated onto cathode test panels and cured in the manner described in Example 1 which resulted in fully cured, hard, and MEK resistant paint films.

EXAMPLE 3

Electrocoating resins were synthesized in a manner similar to Examples 1 and 2 by reacting 10 weight parts of methylethanolamine with 100 weight parts acrylated soybean oil (epoxidized soybean oil having an oxirane content of 7% reacted with 10 mole percent acrylic acid). Samples were sensitized as in Examples 1 and 2. The amine adduct on the polymer was completely neutralized by adding 5% by weight lactic acid which was 10% excess equivalents for neutralization. Paint films of 0.3 mils were electrocoated onto cathode test panels and cured as described in Examples 1 and 2. Hard, fully cured MEK resistant paint films resulted.

EXAMPLE 4

An acrylated acrylic resin was synthesized in butyl cellosolve solvent by solution polymerization of 4 moles of acrylic butyl ester and 2 moles of glycidyl acrylate to obtain an acrylic solution polymer containing oxirane functionality and a molecular weight of about 50,000. The polymer was thereafter reacted with 2 moles acrylic acid to produce a polar pendent acrylic unsaturation which was further reacted with 0.5 moles of diethanol amine to produce an unsaturated acrylic polymer having amine pendent on the polymer backbone. The butyl cellosolve was removed and the foregoing amine containing polymer was sensitized with UV sensitizer by mixing with 5% benzophenone, and thereafter 70% neutralized with acetic acid, and solubilized in water to provide a 5% aqueous dispersion. Paint films of 0.2 mils were electrocoated onto cathode steel test panels and cured with ultraviolet light as indicated in Example 1. Hard, fully cured MEK resistant paint films resulted.

EXAMPLE 5

The polymer of Example 4 was synthesized except that the amine was copolymerized into the backbone of the acrylic resin by reacting 2 moles of dimethylaminoethylacrylate with the 4 moles of butyl acrylate and 2 moles of glycidylmethacrylate followed by reaction of the pendent oxirane functionality with 2 moles of acrylic acid in accordance with the detailed method disclosed in "Preparative Methods of Polymer Chemistry," Sorenson & Campbell, Interscience Publishing, N.Y. (1961), pages 149-234. The polymer was sensitized with a 5% mixture of benzophenone and Michler's Ketone (4/1 ratio), and then solubilized by reacting with 10% sorbic acid. The polymer was then dispersed in water to provide a 20% aqueous electrocoating solution. Paint films of 0.3 mils thickness were electrocoated onto steel cathode test panels and cured in the manner set forth in Example 1 to produce hard and fully cured paint films.

EXAMPLE 6

An acrylic solution polymer was made by solution polymerization of 3 moles of glycidylmethacrylate, 1 mole of styrene, and 3 moles of butylacrylate in butyl cellosolve and thermally initiated in accordance with the procedure for acrylic polymerization given in "Preparative Methods of Polymer Chemistry," W. R. Sorenson and T. W. Campbell, 1961, Interscience Publishers, N.Y., pages 149-234. This acrylic polymer contained glycidyl or oxirane functionality and was further reacted with 2.9 moles of acrylic acid until the weight/epoxide ratio and the acid number were zero. This reaction resulted in an acrylic polymer containing pendent acrylic unsaturation. This polymer is further reacted with one mole of diethanolamine, in a Michael type Addition, with the unsaturation of the pendent acrylic functionality wherein predominantly the diethanolamine (secondary amine) adds to the terminal carbon and the hydrogen therefrom adds to the penultimate carbon. This resin system containing the amine functionality and the acrylic unsaturation was mixed with 5% butyl ether of benzoin, 100% solubilized with 10% lactic acid, dissolved in demineralized water to a 7% NV solution. This cathodic UV curable electrocoating polymer was then electrodeposited onto several cathode steel panels at 100 volts varying from 1 to 5 seconds. The resulting films were heated with an IR source for 5 minutes to achieve satisfactory flowout of the coating and then cured on a 8,000 watt Ashdee UV curing unit for 10 seconds exposure time. The result was a fully cured MEK resistant film.

The foregoing was repeated with a 3% sensitizer system of a mixture of benzophenone, butyl ether of benzoin, Michler's Ketone, and 2,2' dithiobisbenzothiazole in a ratio of (2/1/0.5/1). The results were the same as previously described.

EXAMPLE 7

A solution acrylic resin was made according to the procedure outlined in Example 6 except that the reactants were 1.5 moles of methyl methacrylate, 2.0 moles of butyl acrylate, 2.0 moles of hydroxyethylacrylate. Toluene and 0.5% concentrated sulfuric acid was added along with 2 moles of acrylic acid. This reaction mixture was refluxed until no more water appeared in the azeotrope. The result was an acrylic unsaturated functional resin produced through direct esterification of acrylic acid onto the hydroxyl functionality of the resin backbone. This acrylic unsaturated resin was then reacted with 0.7 mol dialkyl amine through Michael type addition. This UV curable cathode resin system was mixed with 2 chlorothioxanthone and the butyl ether of benzoin, neutralized, solubilized, electrodeposited, and UV cured in a manner similar to Example 6. Hard MEK resistant coatings resulted.

EXAMPLE 8

Acrylic resin similar to Example 7 and having pendent hydroxyl groups was reacted with n-methylolacrylamide by transetherification to provide acrylamide unsaturation in the polymer backbone. The polymer was sensitized, solubilized, electrocoated, and cured in the manner indicated in Example 6. Hard, fully cured paint films resulted.

EXAMPLE 9

The polymer in Example 4 was synthesized with the modification that the secondary amine of diethanolamine (2 moles) was reacted with pendent glycidyl groups on the acrylic resin backbone followed by esterification of a hydroxyl on the alkanolamine with 2 moles acrylic acid in the manner described in Example 7. An electrocoating composition was produced, electrocoated onto a cathode steel substate, and cured with UV. Hard, fully cured paint films were obtained.

EXAMPLE 10

A difunctional amine epoxy resin was produced by reacting at 80° to 100° F in butyl or hexyl cellosolve two moles of diethanolamine with one mole of epoxy resin being a diglycidyl ether of bisphenol A having an epoxide equivalent weight of about 175. The amino epoxy resin was then esterified by 2 moles of acrylic acid by refluxing in toluene similar to Example 7 through the aliphatic hydroxyl of the diethanolamine resulting from opening the oxirane ring during the initial amino-epoxy reaction. The polymer was sensitized with 10% benzophenone and solubilized thereafter with 10% acetic acid in water to yield 15% aqueous electrocoating solution Paint films were electrocoated and cured in the manner set forth in Example 1 resulting in fully cured hard films.

EXAMPLE 11

Example 10 was repeated with the exception that the epoxy resin starting material was an epoxy having an epoxide value of about 540 and being the reaction product of epichlorohydrin and bisphenol A. An ultraviolet curable electrocoating resin resulted.

EXAMPLE 12

Ultraviolet curable cathode type electrocoating resins can be synthesized by reacting toluenediisocyanate, a diol (ethylene glycol, propylene glycol, polyethylene glycol, or polypropylene glycol), an alkanolamine, and a hydroxy substituted acrylate or methacrylate or methylolacrylamide.

Specifically, two moles of toluenediisocyanate were reacted with 1 mole of ethylene glycol to produce an isocyanate terminated urethane resin. This resin was then further reacted with two moles of triethanolamine and then reacted with two moles of toluenediisocyanate hydroxyethylacrylate adduct to produce an ultraviolet curable amine containing acrylate unsaturated urethane resin. The urethane resin was sensitized with 5% mixture of xanthone/benzophenone by mixing the sensitizer into the urethane resin, then solubilizing the sensitizerd resin by reacting with 10% lactic acid and dispersing the same in water to provide a 10% aqueous electrocoating solution. The urethane resin was electrocoated onto a test panel and cured by ultraviolet energy as described in Example 1 to produce fully cured, hard and MEK resistant films.

EXAMPLE 13

One mole of the epoxy resin described in Example 11 was reacted with two moles of dimethylethanol amine to produce an amine containing epoxy resin which was further modified by linseed fatty acid by esterification of the fatty acid with a free hydroxyl group on the resin backbone. The resin was further modified to provide acrylic unsaturation by reacting the adduct of hydroxyethylacrylate and toluenediisocyanate and by reacting the isocyanate with a free hydroxyl on the polymer backbone. The resin was sensitized with 10% of benzoylbiphenyl sensitizer, solubilized with 10% acetic/benzoic acid, and dispersed in water to provide a 20% aqueous electrocoat paint film. Paint films were electrocoated on test panels and cured by ultraviolet energy as indicated in Example 1. Fully cured, hard MEK resistant films resulted.

EXAMPLE 14

One mole of epoxy Novolac resin (phenolic resins reacted with epichlorohydrin) was reacted with two moles of diallyl amine and further reacted with 1 mole of sorbic acid. Other suitable monocarboxylic acids include acrylic, benzoic, and acetic. The polymer was further reacted through transetherification process with n-butoxymethylolacrylamide to produce an ultraviolet curable electrocoating resin. Paint films electrocoated and cured in the manner set forth in Example 1 produced fully cured, hard MEK resistant films.

EXAMPLE 15

Example 11 can be repeated with exception that instead of esterification with acrylic acid trans-etherification with 2 moles of the methyl ether of n-methylol acrylamide was effected. This polymer can be synthesized and solubilized and cured in the manner set forth in Example 1. Alternatively, this polymer can be modified by further reaction with one mole of linseed fatty acid and then sensitized, solubilized, electrocoated, and cured in the manner set forth in Example 1.

EXAMPLE 16

The following Table 1 illustrates the various types of polymers containing amine in the polymer backbone that can be utilized in the manner described in the foregoing examples.

TABLE 1

| | |
|---|---|
| a) | 1 mole vinylbenzyl chloride |
| | 1 mole diallylamine |
| b) | 1 mole trimethylolpropane triacrylate |
| | 1 mole diallylamine |
| c) | 1 mole melamine acrylate |
| | 0.5 mole diallylamine |
| d) | 1 mole pentaerythitol triacrylate |
| | 1 mole diethanolamine |
| e) | 2 moles methylisobutyl ketone |
| | 1 mole diethylene triamine |
| | foregoing reacted to produce a ketimine blocked primary amine which was thereafter reacted on a molar basis with trimethylolpropane triacrylate at about 30° C in butyl cellosolve solvent. |

Table 2 indicates secondary amines that can be added to pendent acrylic unsaturation of acrylic polymers.

TABLE 2 di-n-butylamine
diallylamine
n-methyl benzylamine
n-methylbutylamine
n-methylcyclooctylamine
phenylbutylamine
di-n-hexylamine
1-diethylamine-2-propanol
3-diethylamine-1-propanol
diethylene triamine (blocked with ketone).

The following Examples 17 to 29 illustrate a UV sensitizer reacted into the polymer backbone prior to solubilizing the polymer in water to produce a water dispersed electrocoating resin.

EXAMPLE 17

One mole of ethylenetriamine was reacted (in toluene) with two moles of methyl ethyl ketone to produce a diimine adduct having secondary amine functionality. Two mole equivalents of this diimine adduct were reacted (in butyl cellosolve) with one molar equivalent of epoxy resin (glycidal ether-bisphenol A, epoxide value = 540). A UV sensitizer was introduced into the polymer chain by reacting the diisocyanate groups of a mono adduct (hydroxyethyl acrylate reacted with toluenediisocyanate) with a sensitizer prepolymer (1 mole benzoylbenzoic acid reacted with 1 mole propylene oxide), which was thereafter reacted with the foregoing amine modified epoxy resin containing reactive free hydroxyl functionality. The polymer contained 5% benzoylbenzoic acid based on the polymer total weight. The resulting polymer solubilized, electrocoated onto cathode steel test panels, and cured in the manner described in Example 1. The paint films cured hard with only 5 seconds exposure to the UV sources. Film hardness was H-2H and withstood over 100 MEK rubs.

EXAMPLE 18

One mole of 2-benzoylbenzoic acid was reacted with acrylic polymer (1 mole styrene, 3 moles glycidyl methacrylate, 2 moles butyl acrylate) to introduce a UV sensitizer into the polymer backbone. The polymerization reaction was followed by further reaction with 2 moles of acrylic acid and thereafter with 1 mole diethanol amine in a Michael reaction with the pendent acrylic groups. The foregoing polymer was dispersed in water, electrocoated, and cured as set forth in Example 18. Hard, MEK films resulted.

EXAMPLE 19

The polymer in Example 18 was synthesized but with the exception that UV sensitizer was reacted into the polymer backbone by reacting one mole of 4-hydroxybenzophenone with the acrylic polymer in the first reaction step. Hard, MEK resistant paint films resulted upon exposure to UV similar to Example 17.

EXAMPLE 20

The polymer of Example 17 was modified by reacting one mole of 2-carboxylthioxanthone into the acrylic polymer backbone in the first step. Similar excellent electrocoated film resulted upon exposure to UV.

EXAMPLE 21

One mole of 4,4,4',4'-benzophenone teracarboxylicdianhydride was reacted with epoxy resin (epoxide No. = 176), followed by further reaction with 4 moles of acrylic acid until an acid number of about zero was reached. This polymer was further reacted with one mole of diallylamine. The resulting polymer was solubilized, dispersed into water, electrocoated, and cured with UV as described in Examples 1 and 17. Hard MEK resistant films were obtained comparable to the results in Example 17.

EXAMPLE 22

One mole of 2-hydroxy-3-fluorenone was reacted with one mole of propylene oxide which was further reacted with a urethane polymer (1 mole TDI + 1 mole pentaerythitoltriacrylate), and further reacted with 1 mole of diethanolamine. Results were comparable to Example 17.

EXAMPLE 23

The polymer in Example 22 was modified by reacting one mole of 4-n-methylamino benzophenone to provide UV sensitizer in the polymer backbone. Electrocoating compositions comparable to Example 17 were obtained having hard MEK resistant paint films.

EXAMPLE 24

Epoxy resin (epoxide number = 176) was reacted with acrylate to produce an epoxydiacrylate which was reacted with 2% (wt.) of 4,4,4',4' benzophenone tetracarboxylicdianhydride, and thereafter followed by reaction with 3% (wt.) of diethanolamine. Excellent electrocoating composition comparable to Example 17 was obtained providing hard MEK resistant paint films.

EXAMPLE 25

The polymer in Example 24 was modified to introduce 4,4'-benzophenone dicarboxylic acid UV sensitizer in the polymer chain with comparable results as Examples 17 and 24.

EXAMPLE 26

The polymer in Example 17 was modified by reacting one mole of ethylenetriamine with (a) two moles acetone, or (b) methylisobutylketone to produce a diimine adduct containing secondary amine functionality which were further reacted as described in Example 17. Excellent electrocoating compositions were produced comparable to Example 17.

EXAMPLE 27

Any epoxy resin containing terminal epoxide groups can be reacted with a secondary amine selected from morpholine, diethanolamine, methylethanolamine, or diallylamine and thereafter reacted with an acid UV sensitizer selected from:
 a. 2-benzoylbenzoic acid;
 b. 4'-methylbenzophenone, 2-carboxylic acid;
 c. 4'-ethylbenzophenone, 2-carboxylic acid;
 d. 4'-chlorobenzophenone, 2-carboxylic acid;
 e. 3'-chloro-4'-methyl-benzophenone-2-carboxylic acid;
 f. 3'-nitro-4'-chloro-benzophenone-2-carboxylic acid; and
 g. 2-(4-hydroxy-benzoyl)-benzoic acid.

These polymers were each further reacted with acrylic acid by esterification of available hydroxyl groups on the polymer introduced in the polymer in reacting the epoxy with the secondary amine. Excellent electrocoating compositions are produced by solubilizing as described in Example 1. Excellent hard and MEK resistant paint films result upon exposure to UV (5 seconds) comparable to films in Example 17.

EXAMPLE 28

Similar to Example 27, UV sensitizers can be introduced into the polymer by reacting epoxy acrylate with a diisocyanate, followed by reaction with one of the following UV sensitizers.
 a. 2-hydroxy acetophenone;
 b. 3-hydroxy acetophenone;
 c. 4-hydroxy acetophenone;
 d. 5-chloro-2-hydroxy benzophenone;
 e. 2-hydroxy-benzophenone;
 f. 4-hydroxy-benzophenone;
 g. 2-hydroxy-4-methoxy benzophenone;
 h. 3-hydroxy-p-anisaldehyde; or
 i. 2-hydroxy-5-methoxy benzaldehyde.

EXAMPLE 29

Any epoxy resin having terminal epoxide groups can be reacted with the following UV sensitizers:
 a. 2-hydroxy-4-methoxy benzophenone;
 b. 3-hydroxy-p-anisaldehyde;
 c. 2-hydroxy-5-methoxy benzaldehyde;
 d. 3-chloro-4-hydroxy-5-methoxybenzaldehyde;
 e. 4'-chloro-2-hydroxy-4-methoxy benzophenone;
 f. 5-chloro-2-hydroxy-4-methylbenzophenone; or
 g. 2-N-methylamino-benzophenone.
 h. 4-N-methylamino-benzophenone;
 i. 2-N-methylamino-acetophenone;
 j. 3-N-methylamino-acetophenone;
 k. 3-N-methylamino-acetophenone;
 l. 4-N-methylamino-acetophenone; or
 m. 2-mercaptobenzophenone.

The foregoing prepolymers can be further reacted with diisocyanate, and further reacted with polymers such as epoxy, acrylic, or urethanes to produce a polymer containing UV sensitizer attached to the polymer backbone. These polymers can be solubilized and dispersed into water to produce excellent UV curable electrocoating polymer systems.

Excellent fully cured hard films are achieved by introducing the sensitizer into the polymer chain providing a substantial improvement over electrocoating polymers containing UV sensitizers in the polymer phase as disclosed herein. Generally, cured paint films are compared as follows.

| Test | UV Sensitizer Mixed In Polymer Phase | UV Sensitizer in Polymer Backbone |
|---|---|---|
| MEK resistance | 50 MEK rubs | 100 MEK rubs |
| Pencil hardness | 6B-F | H-2H |
| Stability of electrocoating solution | 5 hours | 500 hours |

I claim:

1. In a process for electrocoating a paint film onto a cathode substrate disposed within an aqueous electrocoating bath, the electrocoating composition being dispersed in water and comprising an ethylenically unsaturated polymer containing ethylenically unsaturated groups selected from acrylyl, acrylamide, and allyl, said polymer having amine groups thereon being neutralized with a proton donating solubilizing salt or acid for dispersing said polymer within water, and electrocoating said polymer onto the cathode substrate to form a film thereon, the improvement comprising:
 reacting at least about 2% by weight of an ultraviolet sensitizer with said polymer to attach the ultraviolet sensitizer to the polymer structure, said ultraviolet sensitizer being reacted onto the polymer structure prior to the step of neutralizing the amine groups on the polymer and prior to dispersing the polymer into the electrocoating water bath;
 electrocoating said polymer containing the ultraviolet sensitizer connected to the polymer structure onto the cathode substrate wherein the ultraviolet sensitizer remains tied to the polymer structure while electrocoating a polymeric film onto the cathode substrate; and
 exposing the polymer film to ultraviolet energy to activate the ultraviolet sensitizer connected to the polymer structure and cross-link the ethylenic unsaturation in the polymer structure to provide a cured paint film on the cathode substrate.

2. The process in claim 1 wherein the polymer is an acrylic polymer having reactive pendent acryllyl unsaturation, and said polymer is reacted with a secondary amine selected from morpholine, diethanolamine, methylethanol amine, and diallylamine by addition reaction through said pendent acrylic reaction prior to the step of neutralizing and solubilizing said polymer.

3. The process in claim 1 wherein the ultraviolet sensitizer is a carboxylated phenyl nuclear ketone combined with said polymer by incorporating said sensitizer into the polymer structure and comprises at least about 2% of said polymer on a weight basis.

4. The process in claim 3 wherein the sensitizer is selected from benzaldehyde derivatives, acetophenone derivatives, and benzophenone derivatives.

5. The process in claim 3 wherein said sensitizer comprises between about 3% to 20% of the polymer on a weight basis.

* * * * *